Feb. 10, 1970 M. M. STERNAU 3,494,098
APPARATUS FOR SIMULTANEOUSLY MAKING CLOSURES
AND SEALING CONTAINERS
Filed Aug. 1, 1967 4 Sheets-Sheet 1

INVENTOR
MARTIN M. STERNAU
BY
James M. Heilman
John J. Toney
ATTORNEYS.

Feb. 10, 1970     M. M. STERNAU     3,494,098
APPARATUS FOR SIMULTANEOUSLY MAKING CLOSURES
AND SEALING CONTAINERS
Filed Aug. 1, 1967     4 Sheets-Sheet 2
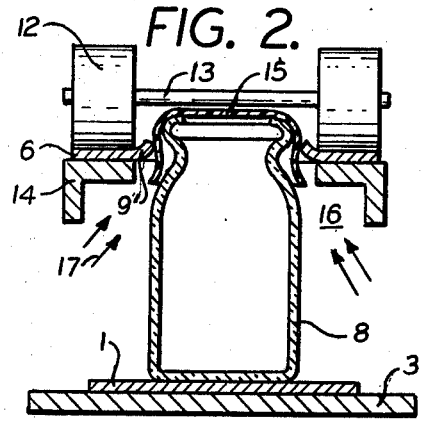
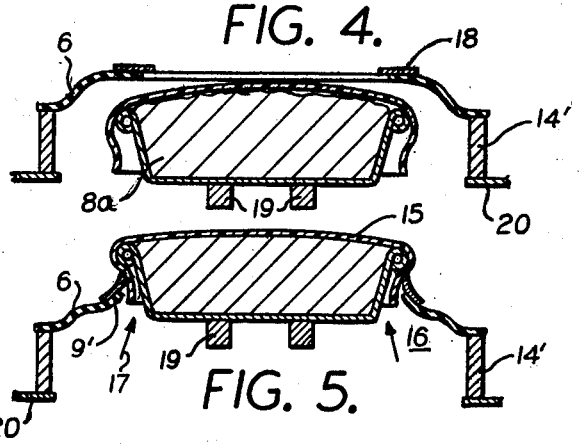
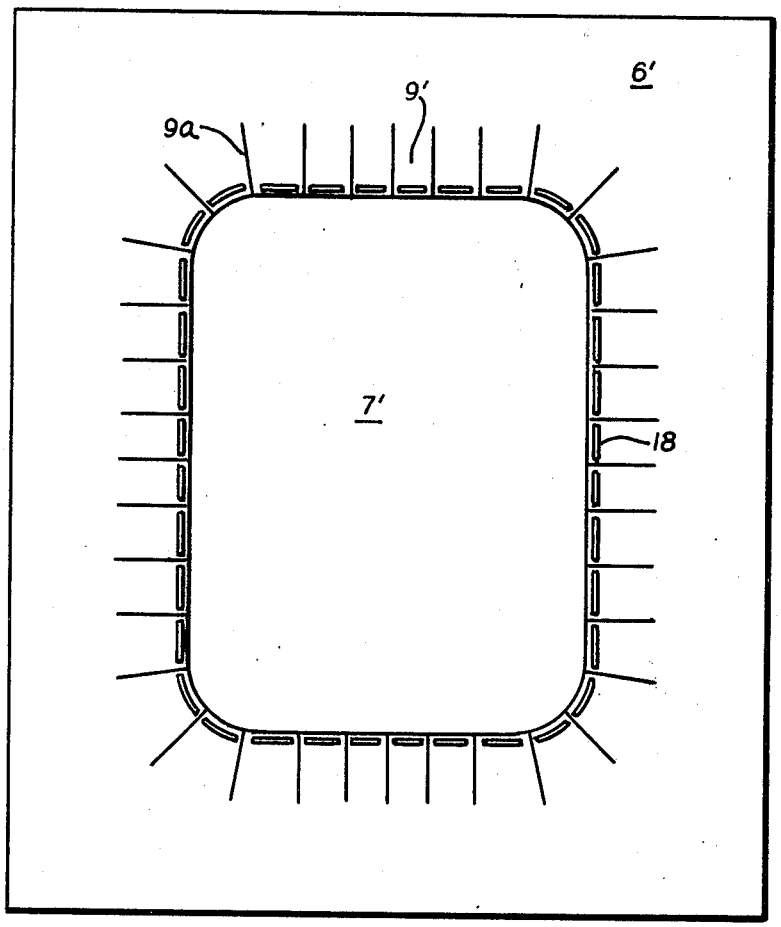
INVENTOR
MARTIN M. STERNAU
BY
ATTORNEYS.

INVENTOR.
MARTIN M. STERNAU

Feb. 10, 1970 M. M. STERNAU 3,494,098
APPARATUS FOR SIMULTANEOUSLY MAKING CLOSURES
AND SEALING CONTAINERS
Filed Aug. 1, 1967 4 Sheets-Sheet 4
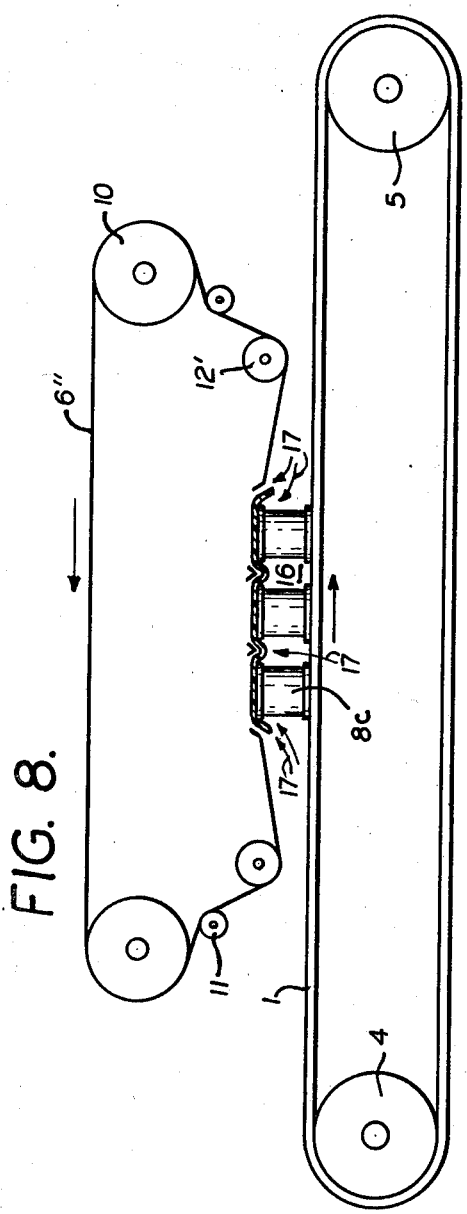
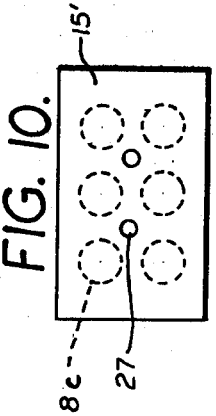
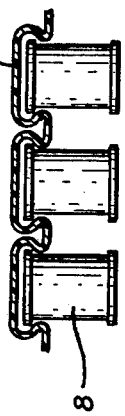
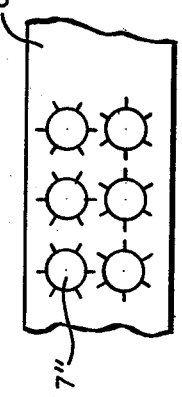
INVENTOR
BY MARTIN M. STERNAU
James M. Heilman
John J. Toney
ATTORNEYS.

> United States Patent Office 3,494,098
Patented Feb. 10, 1970

3,494,098
APPARATUS FOR SIMULTANEOUSLY MAKING CLOSURES AND SEALING CONTAINERS
Martin M. Sternau, Flushing, N.Y., assignor to W. R. Grace & Co., Duncan, S.C., a corporation of Connecticut
Filed Aug. 1, 1967, Ser. No. 657,706
Int. Cl. B65b 7/00, 7/28
U.S. Cl. 53—329                6 Claims

ABSTRACT OF THE DISCLOSURE

This invention pertains to a apparatus, and to a method, for simultaneously capping and sealing containers, employing the method of selective or controlled shrinkage of heat shrinkable, oriented plastic film or sheet, by placing the film or sheet over the mouth of a filled container, the film being larger than the mouth of the container, and applying heat, selectively, first only to the extended edge of the film whereby to cause the edge of the film to shrink quickly, and second to the remaining portion of the film so as to form a closure hermetically sealing the container.

---

This invention relates to an apparatus for making closures and sealing containers with shrinkable thermoplastic film. It is based on the following principle: When a piece of heat shrinkable, oriented plastic film is subjected to heat of any type, it will shrink and shrivel into an irregular ball-shaped configuration due to its inherent oriented characteristics. However, when the central or interior portion of the film is shielded or otherwise insulated from the direct or indirect influence of heat while the perimeter or rim area is subjected to heat, only the rim area of the film will shrink and will be reduced, thereby being curled and producing a cap-shaped or cup-shaped configuration.

In the presence of a container, tub or cup, the film being larger than the mouth of the container and having been placed upon the mouth of the container, and retained thereon and shielded in the area of the mouth of the container, only the exposed edges or rim will shrink causing the edges of the film to curl. The edges will continue to shrink until the curled edge portion of the film is physically restrained by the rim of the container, whereby to form a cap-shaped closure or cover with an expansible or elastic bead or band upon the container. This closure will tightly conform to the mouth of the container regardless of its shape since the film will always assume the configuration of the container mouth, be it round, oval, rectangular, or any other shape. If heat is thereafter applied to the center portion of the film which previously had been shielded, that is, the portion within the area defined by the rim of the container, this central area will then shrink and become tight whereby the cap or cover originally formed will form a still tighter hermetical seal around the container.

In view of the above statements, it follows that one of the objects of this invention is to provide an apparatus, and a method, for performing selective shrinkage of a draped or uniformed piece of heat shrinkable, oriented plastic film or sheet to form a closure directly upon a container and simultaneously seal the container.

Another of the objects of this invention is to provide an apparatus, machine, or device for performing the method of selective shrinkage of heat shrinkable, oriented plastic film to form a closure directly upon a container and simultaneously to seal the container, i.e., the forming and sealing occurring at the identical instant, said apparatus having means for cutting a piece of film, means for placing said film on top of the mouth of a filled container, means for applying heat, selectively, to the rim area of the film, means for shielding the center portion of the film while heat is applied to its peripheral area, means for thereafter applying heat to the center portion of the film, and transporting means for the filled container before and after sealing.

A further object of this invention is to provide a closure formed by a machine, and a method, using a transparent (preferably), heat shrinkable, oriented plastic film or sheet, which film is thin, fragile, flexible, limp, drapable (preferably), unformed plastic of any type. Heat shrinkable films that are normally less than .002" thick and capable of large shrinkage in all directions parallel to the film surfaces are particularly applicable. Actually films in the range of .0002" (20 gauge) to .0008" (80 gauge) are generally satisfactory and may be used. The thickness of the film, of course, will depend somewhat upon the area to be covered. However, it is within the scope of my invention to use any type film that is shrinkable in only one direction as well as in two directions (e.g. an oriented film of the so-called tensilized or cross-tensilized type) which could be used on containers of any particular form, such as on a circular or rectangular container.

Typical examples of certain films which could be used are oriented films of rubber hydrochloride (oriented "Pliofilm" [1], such as "Snug-Pak" [2]) or of vinylidene chloride (oriented "Saran" [3], "Cryovac" [4]), biaxially oriented irradiated polyethylene, biaxially oriented polypropylene, heat shrinkable nylon, heat shrinkable polyester ("Mylar" [5]), etc., and including any high shrink energy materials or polymers, which are heat shrinkable by reason of their oriented internal structure commonly induced by stretching the same unidirectionally or multidirectionally while heated or supercooled. Obviously, the "orienting" of such films may be done by mechanical, pneumatic, or other methods for expanding or stretching the films, or other means of cross-linking the molecular arrangement, comprising chemical reactions, irradiating, etc.

The selection of films of suitable shrinkability, suitable shrinkage temperature, and suitable strength will be dictated primarily by the nature of the container or contents, and the temperature to which the localized area may be heated when the sealing of the closure to the container is effected, and such selection may be readily made. For a more extended disclosure of the type film and conditions used herein, reference is made to the above prior heat shrinkable film art.

With the foregoing and other objects in view as will appear from a reading of the following specification and claims, the invention resides in the novel arrangement and combination of parts and in the details of construction and process of manufacture herein described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing, and that the structural details of the apparatus, or particular steps of the method, herein set forth may be varied to suit particular purposes and still remain within the inventive concept.

Referring broadly to the figures:

FIG. 1 illustrates a general perspective of the apparatus for performing the method of the invention.

---

[1] "Pliofilm" of Goodyear Tire & Rubber Co.
[2] "Snug-Pak" of Tee-Pak, Inc.
[3] "Saran" Wrap of Dow Chemical Co.
[4] "Cryovac" of W. R. Grace & Co.
[5] "Mylar" of E. I. du Pont & Co.

FIG. 2 is a cross-sectional detail taken on the line 2—2 of FIG. 1.

FIG. 3 is a modified form of belt showing a substantially rectangular aperture with pressure weights on each flap.

FIG. 4 is a cross-sectional view of a modified apparatus showing a vertical movable container in a lower depressed or non-sealing position.

FIG. 5 is similar to FIG. 4, but showing the container in elevated or sealing position.

FIG. 6 illustrates a further modified apparatus, while

FIG. 8 is a still further modified construction illustrating the capping of multiple cans and at the same time forming an integral carrier therefor.

FIG. 9 is a plan view of the pressure or positioning belt for the multiple pack.

FIG. 10 is a plan view of the shrinkable sheet or film, or carrying closure, immediately prior to the application of heat.

FIG. 11 illustrates a longitudinal cross-section of the carrying closure after shrinking and sealing a series of containers.

Figure 1:
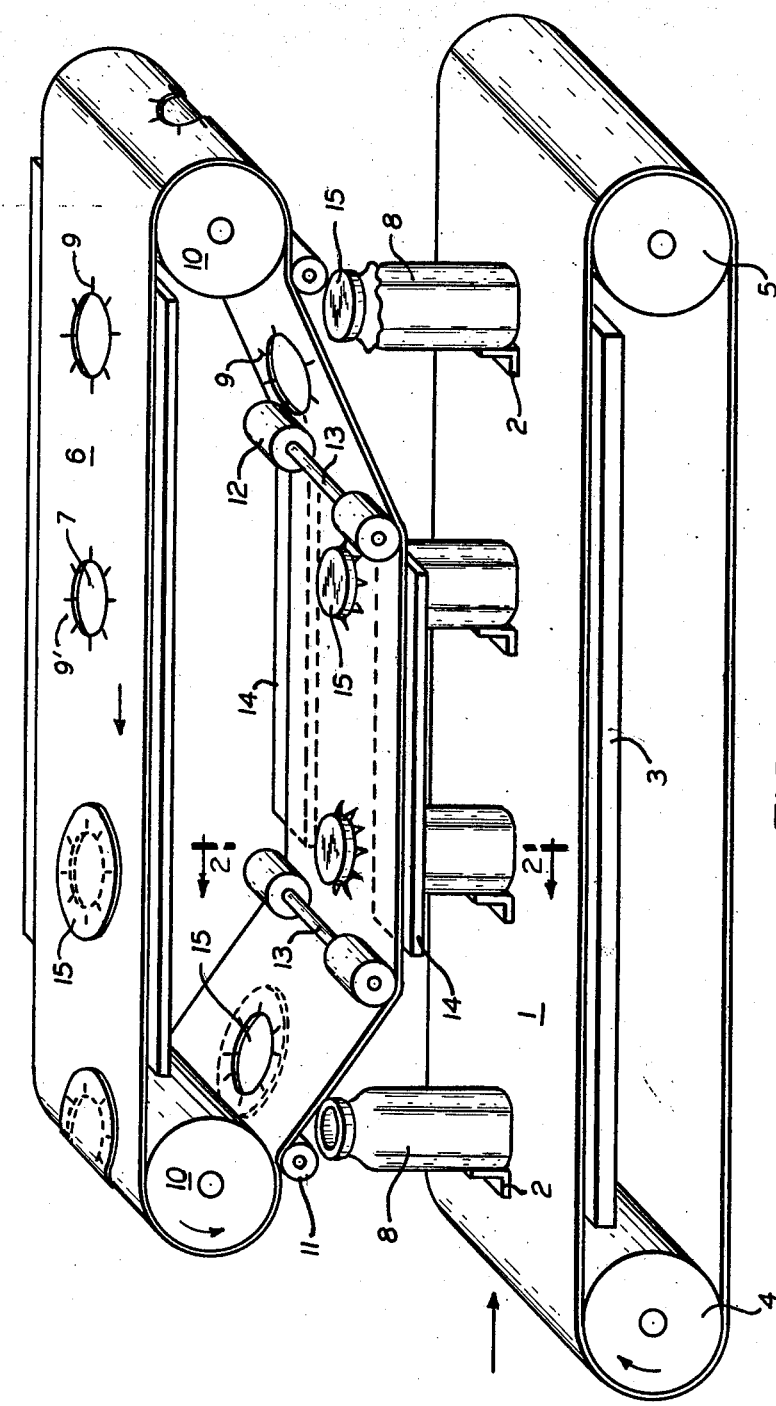

Referring to the details, and primarily to FIG. 1, numeral 1 indicates a conveyor belt having spaced positioning stops 2 thereon and passing over guide plate 3 while traveling between conventional rollers 4 and 5. An upper or pressure belt 6 is provided with cooperating apertures 7 which are spaced apart the same distance as the stops 2 for registering the filled containers, i.e., bottles 8, tubs 8a, cups 8b, or cans 8c. The circumference of the apertures are provided with a series of slits or slots 9 to permit the tops, necks, or rims of the containers to be temporarily forced therethrough when the containers are being sealed by heat, applied first and primarily to the edge of the film or sheet.

Pressure belt 6 also revolves around the conventional rollers 10, guide and tensioning rollers 11, and pressure rollers 12 connected by rod 13. Flat or preferably angle plates or guides 14 position and support the pressure belt 6 against the force applied by the pressure rollers as can be best seen in FIG. 2.

A piece or section of film 15 of suitable size, strength, and thickness, is placed automatically on the pressure belt by any conventional means. Due to a slight clinging tendency or attraction between the film and the pressure belt, the film will remain in correct position on the belt, even when the film is on the under side thereof, until forced through the aperture due to the downward movement of the pressure belt as it approaches a container. Conventional filling and conventional transfer means are used to position the containers on belt 1.

The belts 1 and 6 may be of any conventional material, but should be heat resistant. Among acceptable types of material are "Teflon," [6] asbestos cloth, and other types of belt material.

FIG. 2 illustrates clearly the process as the conveyor belt carrying a container, and the slitted, apertured pressure belt carrying a film blank are advanced into the heating or sealing zone 16 where hot blasts of air are projected by conventional means. The relatively stiff but flexible tongues 9' effectively force the thin, limp film against the side of the container and provide a barrier which concentrates the heat only against the skirt of the film while clamping or restraining the film and preventing the heat from reaching the top portion of the film.

Heat 17 may be supplied to the film skirt by any conventional means whether by a blast of hot air, infrared heat, electronic agitation, electrical resistance, passing through a restricted area of a hot oven, etc. Electrical resistance heating wires may be incorporated directly in guides 14, or be spaced therefrom, as in heating zone

---

[6] "Teflon" of E. I. du Pont & Co.

16. While the specific apparatus illustrated in FIGS. 1 to 5 is not particularly concerned with subsequently shrinking the central area of the film cap, this may be done, optionally, by providing a final jet of hot air or other heat at the rear end of the guides as the capped container is released from the pressure belt.

FIG. 3 illustrates a section of a belt 6', having rectangular apertures 7' therein, bordered by flexible tongues 9', formed by slits 9a, and weighted by small metal heat conducting tabs or plates 18. A rectangular aperture of this type, with or without the iron, lead, copper, etc. plates, would be used with containers having a similar shape.

FIGS. 4 and 5 illustrate a modified construction wherein the pressure belt 6 travels in the same plane on vertical guides 14' resting on supports 20, and the rectangular or circular tub or tray 8a is raised by a track, spaced belts, or elevator 19 from inoperative position in FIG. 4 to an operative or sealing station in FIG. 5. Here, as in FIG. 3, weighted metal tags 18 not only make a tighter initial connection, but also concentrate and conduct heat directly to the film skirt.

Figure 6:
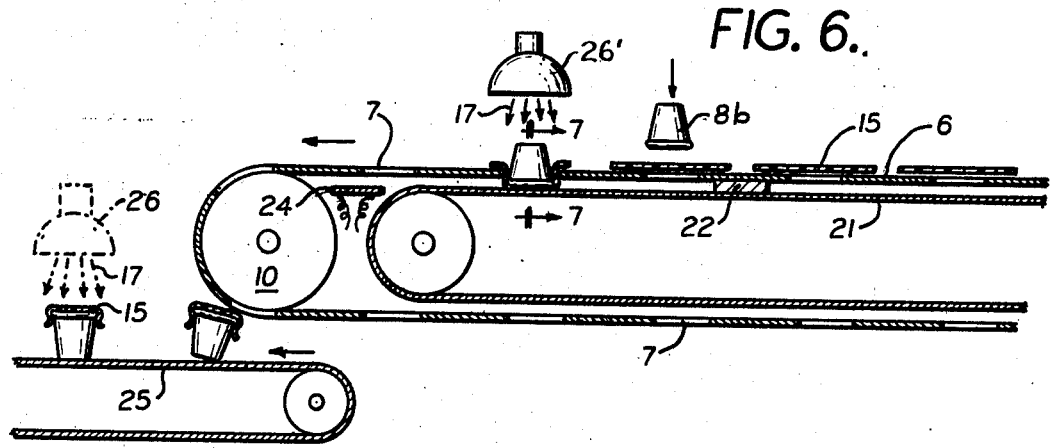
Figure 7:
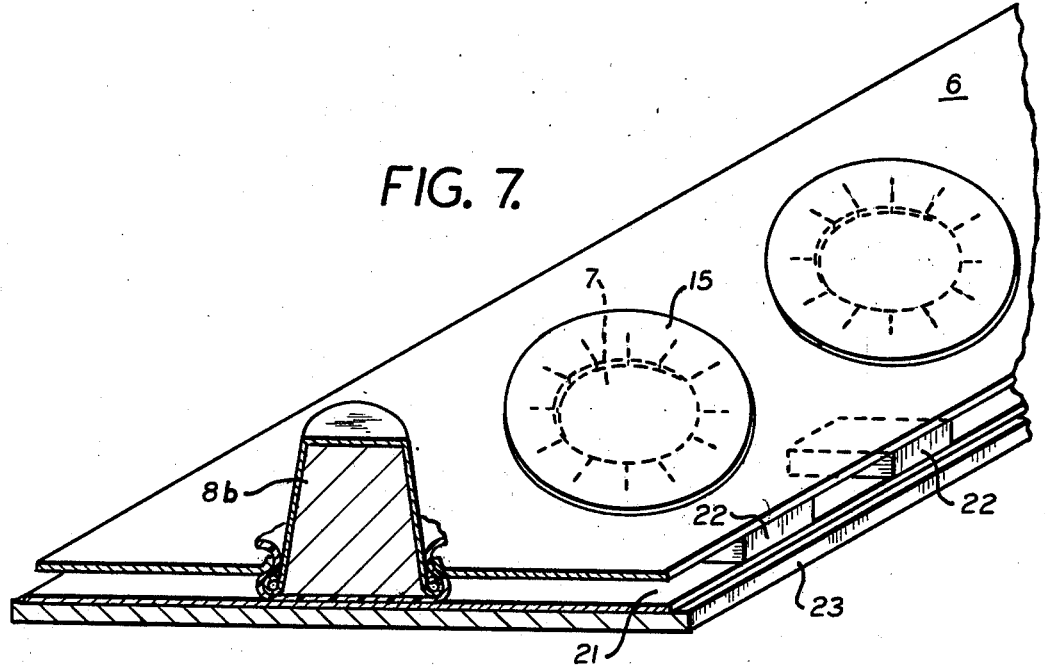
FIG. 7 is a cross-sectional view taken on the line 7—7 of FIG. 6.

Further modifications are illustrated in FIGS. 6 and 7, using either a 2-belt sealing method, or by a 3-belt method. Pieces of film blank 15 are placed automatically over the apertures 7, as in FIG. 6. Cup containers 8b are forced by conventional means through the thin, flexible film lying on belt 6 to come to rest on lower belt 21 which carries spacing blocks 22. Blocks 22 may be between each aperture of belt 6 or at any other desirable spacing. Belt 21 rides on support 23.

Heat supplied from any source, such as, heat lamps 26' will shrink the exposed film edges, and the container may then be sold without any application of heat to the protected top portion. However, for a tighter seal and a more saleable container, either one of an additional step may be engaged in. The first step provides a second source of heat, as for example, an electric hot plate 24 (or second heat lamp) which heat shrinks the central portion of the film as the container passes thereover. If desired, heat source 24 could be omitted, the containers dropped on transfer belt 25 and subjected to heat source 26.

In the modification as illustrated in FIG. 6, stiff or frozen material would have to be packaged in container 8b in order not to fall out. If necessary, a temporary shield could be placed over the mouth of the container unit it contacts the film. Obviously, the position of the apparatus could be turned upside down and containers 8b forced into belts 6 and 21 from the lower side. As mentioned previously, the plastic film would be retained on belt 6 by reason of its clinging tendency.

FIGS. 8–11 illustrate a multiple row of containers arranged in sets, such as, the common "6 pack" carrier arrangement. The belt arrangement is similar to that illustrated in FIG. 1, but with a belt 6" having closely aligned apertures 7" corresponding to the arrangement of the containers on their points of registry. If necessary, pressure rollers 12' could be arranged to move vertically to allow the containers to pass thereunder, and are provided with a longer rod to connect the pressure rollers 12' operating on the outside edges of the film or sheet.

Film or sheet of substantially heavier gauge than that provided for the cover of FIG. 1 are placed on pressure belt 6". Preferably, this sheet is rectangular, irrespective of the shape of the top of the containers, and may be either provided with preformed finger holes 27, or these holes may be punched out by conventional means, in the heating zone 16 when the heat 17 is applied to simultaneously shrink the sheet to form closures, hermetically seal a group of containers, and provide a carrier.

While single and double rows of containers are illustrated in FIGS. 1 and 8, respectively, it should be understood that 10, 20 or more containers could be sealed at the same time merely by using a wider belt, or by placing a large number of separate wide belt machines side by side. Hence, there is no limit to the number of individual containers, "6 pack," "12 pack," etc. which may be quickly sealed.

It is thus seen that I have invented an apparatus and a method of effecting selective shrinkage first and primarily in the rim or draped area of a container by applying any type of heating means and using a slitted shielding belt whereby a closure cover is simultaneously formed and the container hermetically sealed.

Additionally, there is provided a simple, inexpensive, and easily maintained apparatus comprising primarily two movable belts, one of said belts having openings in it to receive the top of a container, and to force a thin, flexible film or sheet over the tops of containers as the two belts move in the same general direction. The filled container may be forced into firm and intimate contact with the film by moving the transporting belt and the pressure belt relatively closer to each other in a vertical direction, or the container may be moved vertically relative to the pressure belt so as to be engaged by the relatively stiff but flexible tongues (and heat retaining weights) on the slitted pressure belt.

Furthermore, there has also been provided means and a method for simultaneously, forming a combination closure, tightly sealing a group of containers, and molding a built-in carrier for a group or pack arrangement of filled containers whereby the entire group may be handled as a unit.

The embodiments of the invention in which an exclusive property or privilege is claimed are defined as follows:

1. An apparatus for providing a closure and simultaneously sealing a container comprising:
   (a) a flat conveyor belt having a straight upper run;
   (b) a flat cooperating pressure belt having spaced apertures and radial slits around the periphery of the apertures, said pressure belt having a straight lower run parallel to and above the upper run of said conveyor belt, the distance between said parallel runs being such that the rim of a container placed upon said conveyor belt will force a central portion of a piece of thin heat shrinkable oriented plastic film placed upon the surface of the pressure belt through the slitted aperture; and,
   (c) means for supplying heat only to an exposed edge of said piece of film to heat and to shrink the edge around the container.

2. An apparatus as set forth in claim 1 wherein the distance between said parallel runs is such that the top only of a container will extend through the slitted aperture.

3. An apparatus as set forth in claim 1 wherein the path of the pressure belt is inclined toward the conveyor belt as it approaches its parallel run and is inclined away from the conveyor belt as the pressure belt leaves its parallel run.

4. An apparatus as set forth in claim 3 wherein said pressure belt and said conveyor belt are supported by guide plates in their respective parallel runs; and, said means for applying heat to the edges of the film is positioned beneath the pressure belt guides.

5. The apparatus of claim 4 including means to supply a parting blast of heat to shrink the top central area of the film on a sealed container as it disengages from the pressure belt.

6. The apparatus of claim 3 wherein spaced apart, enlarged pressure rollers are positioned near each end of the parallel run of the pressure belt, said spaced apart rollers being positioned below the rim of the container to be sealed whereby said container will pass between the enlarged rollers, and the rim of the container and its accompanying film will be forced through the aperture in said belt.

References Cited
UNITED STATES PATENTS

| | | | |
|---|---|---|---|
| 3,061,988 | 11/1962 | Izumi | 53—290 X |
| 2,929,181 | 3/1960 | Poupitch | 53—48 X |
| 3,137,109 | 6/1964 | Rapata | 53—48 |
| 3,133,387 | 5/1964 | Harrison | 53—30 |
| 3,046,711 | 7/1962 | Harrison | 53—30 |
| 3,014,320 | 12/1961 | Harrison | 53—42 |
| 3,262,245 | 7/1966 | Snow | 53—184 |

THERON E. CONDON, Primary Examiner
H. M. CULVER, Assistant Examiner

U.S. Cl. X.R.
53—42